United States Patent [19]

Broshkevitch et al.

[11] 4,054,340
[45] Oct. 18, 1977

[54] PLASTIC ANTIFRICTION BEARING CAGE

[75] Inventors: Constantine P. Broshkevitch; Robert E. Hooper, both of Huron, Ohio

[73] Assignee: General Motors Corporation, Detroit, Mich.

[21] Appl. No.: 718,753

[22] Filed: Aug. 30, 1976

[51] Int. Cl.² .................. F16C 33/46; F16C 33/50
[52] U.S. Cl. ............................................. 308/217
[58] Field of Search ............... 308/217, 237 A, 218, 308/235

[56] References Cited

U.S. PATENT DOCUMENTS

| | | | |
|---|---|---|---|
| 1,963,407 | 6/1934 | Herrmann | 308/217 |
| 3,944,307 | 3/1976 | Bingle | 308/217 |
| 3,966,276 | 6/1976 | Bellarbre et al. | 308/238 |

Primary Examiner—Richard A. Bertsch
Attorney, Agent, or Firm—F. J. Fodale

[57] ABSTRACT

An antifriction bearing cage comprises two plastic pieces which are snap assembled. One cage piece comprises a ring portion and a plurality of circumferentially spaced axial fingers having shank portions at the free ends. The shank portions have radial projections which are aligned with axial grooves extending through the finger portions and ring portion to facilitate molding of the first cage piece in an axial draw mold. The second cage piece merely consists of a ring portion having a plurality of spaced holes having radial enlargements at one end extending to the end surface of the ring portion to facilitate molding of the second cage piece in an axial draw mold. During assembly the radial projections of the one cage piece are snapped into the radial enlargements of the other cage piece to retain the cage pieces together.

3 Claims, 4 Drawing Figures

PLASTIC ANTIFRICTION BEARING CAGE

This invention relates generally to antifriction bearing cages and more specifically to antifriction bearing cages which are of two piece construction.

It is already known from the U.S. Pat. No. 2,591,161 granted to Rudolph R. Kilian on Apr. 1, 1952 to provide a roller bearing cage or retainer which is made of two machined metal pieces which are snap assembled to form the retainer or cage.

Since the aforementioned Kilian patent several designs have been proposed for a plastic antifriction bearing retainer or cage of two piece concentration. See for instance the U.S. Pat. No. 3,172,710 granted to Ralph Altson on Mar. 9, 1965 for a "Cage for Antifriction Bearings"; U.S. Pat. No. 3,387,901 granted to Charles W. Williams on June 11, 1968 for a "Plastic Bearing Retainer"; and U.S. Pat. No. 3,944,307 granted to Gerald L. Bingle on Mar. 16, 1976 for a "Plastic Bearing Cage." All of the above two piece plastic cages involve a shank and hole arrangement for retaining the two pieces together in which the shanks at the ends of the finger portions of one piece after being disposed in the holes in the ring portion of the other piece are permanently deformed to permanently secure the pieces together.

It is also known from the U.S. Pat. No. 2,923,582 granted to Wallace F. Dunn on Feb. 2, 1960 for a "Separator" to provide a plastic separator of two piece construction in which the two pieces are snap assembled. The Dunn separator pieces however are retained together by studs of one piece having an annular ridge and holes of the other piece having annular recesses and consequently are very difficult to mold.

In its broadest terms the object of this invention is to provide a bearing cage of two piece plastic construction which is snap assembled and in which the cage pieces are designed to facilitate the molding thereof from plastic material.

Another object of this invention is to provide a two piece, snap assembled bearing cage of molded plastic construction having relative rigid retention portions for retaining the two cage pieces assembled which retention portions are incorporated in the cage pieces to facilitate the molding of the cage pieces in an axial draw mold.

The exact nature of this invention as well as other objects and advantages thereof will be readily apparent from consideration of the following specification relating to the annexed drawing in which.

Figure 4:
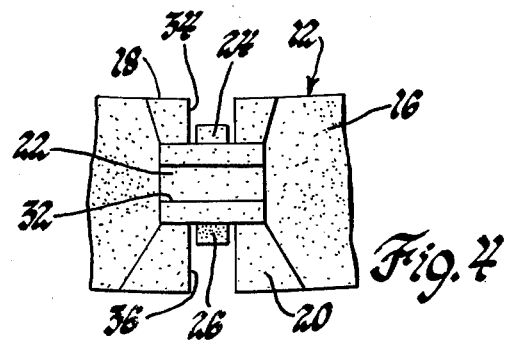
FIG. 4 is a view taken substantially along the line 4—4 of FIG. 2 in the direction of the arrows showing a front view of one of the antifriction bearing cage pieces.

Referring now to the drawing an antifriction bearing cage for circumferentially spacing a complement of rollers (shown in phantom) or other antifriction bearing elements is indicated at 10. The antifriction bearing cage 10 comprises a first piece 12 and a second piece 14 of molded plastic construction, preferably a reinforced synthetic resin such as a fiber filled nylon. The first piece 12 comprises a ring portion 16 and a plurality of circumferentially spaced finger portions 18. The finger portions 18 extend axially from the ring portion 16 in cantilever fashion and have end faces 20 preferably planar, at the free end which define a plane parallel to the ring portion 16. The first piece 12 further has a shank portion 22 of generally rectangular cross section at the free end of each of said finger portions 18 protruding axially from the end faces 20 and the plane defined thereby. The shank portions 22 each have an inner radial projection 24 and an outer radial projection 26 having diverging ramps leading to retention surfaces 28 and 30, respectively, which face the ring portion 16. The retention surfaces 28 and 30 are perpendicular to the shank portions 22 and lie in a common plane parallel to the plane defined by the end faces 20 of the finger portions 18. The shank portions 22 have circumferential slots 32 in their end portions to increase flexibility for assembly purposes. As best seen in FIG. 4 the first piece 12 has an inner axial slot 34 and an outer axial slot 36 extending through each of the finger portions 18 and the adjacent portion of ring portion 16. The slots 34 and 36 are aligned with the projections 24 and 26 respectively and are of sufficient width and depth to expose the entire retention surfaces 28 and 30 to the remote axial end of the first piece 12 at the outboard side 37 of the ring portion 16. The slots 34 and 36 make it possible to mold the piece 12 in an axial draw mold.

Figure 1:
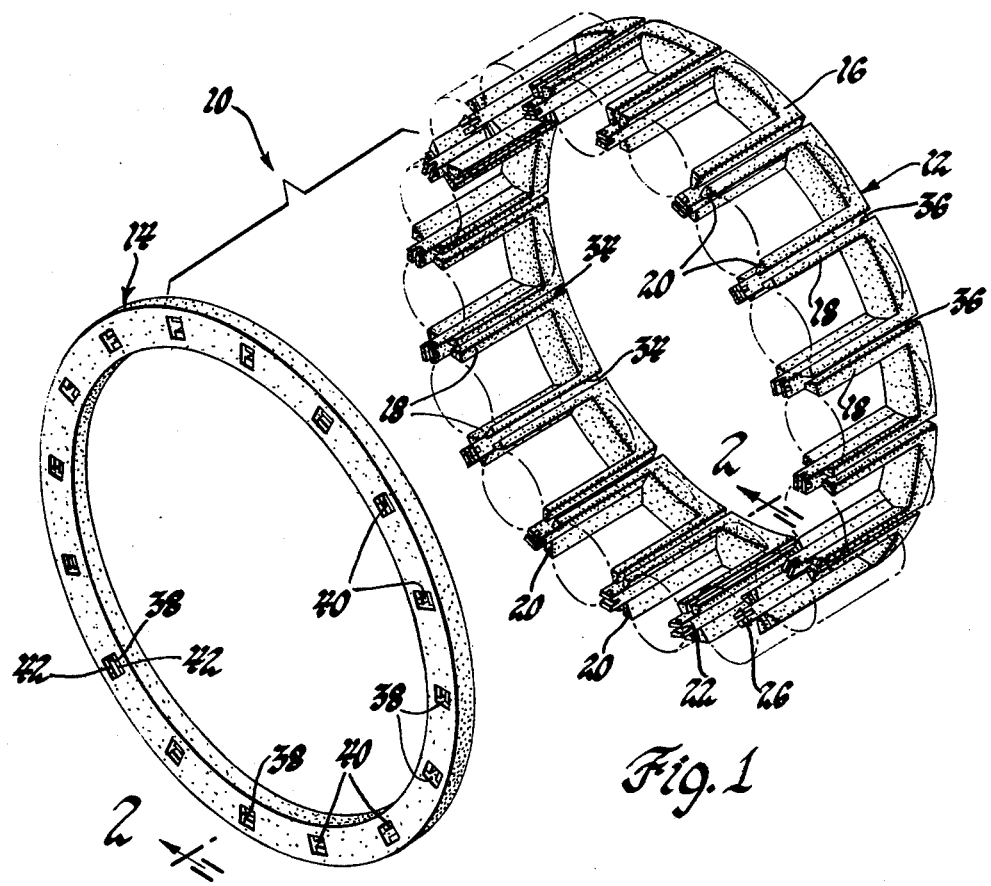
FIG. 1 is an exploded perspective view of an antifriction bearing cage in accordance with this invention.
Figure 2:
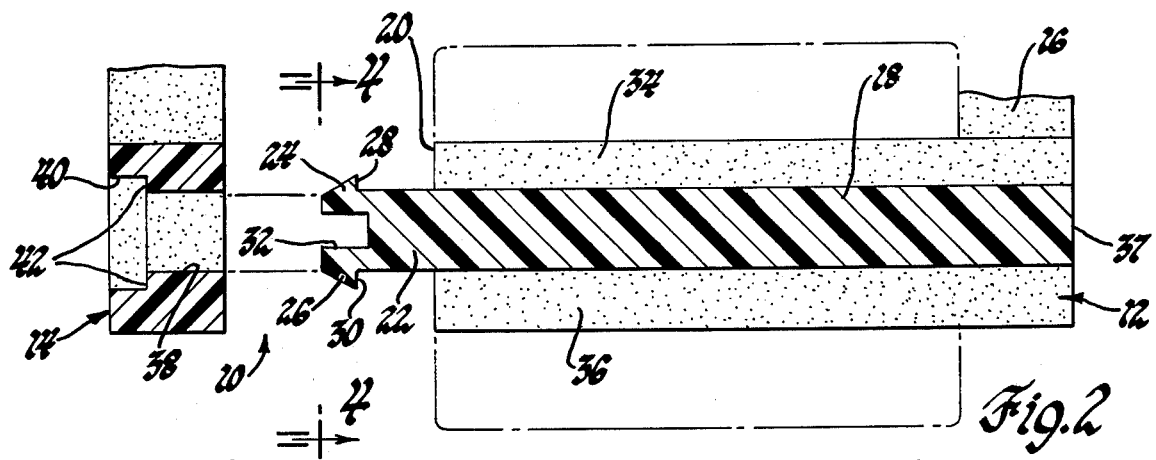
FIG. 2 is a view taken substantially along the line 2—2 of FIG. 1 looking in the direction of the arrows.

An axial draw mold is one in which the mold cavity is completely formed by two cooperating mold parts which open and close the mold cavity by relative movement in the axial direction. Separate mold inserts or core pieces are not required to form the required shape of the mold cavity. In the case of the first cage piece 12, the slots 34 and 36 permit the withdrawal (to the right as viewed in FIG. 2) of the portions of the one mold part which form the retention surfaces 28 and 30 of the projections 24 and 26 respectively.

Figure 3:
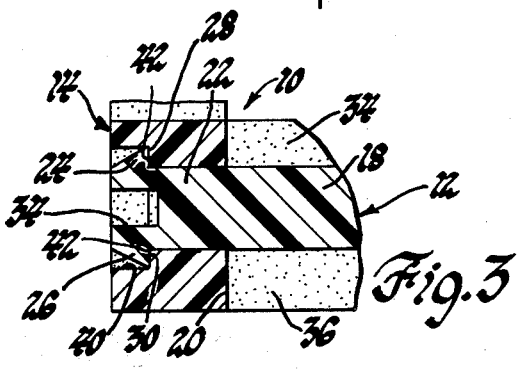
FIG. 3 is a fragmentary view corresponding to FIG. 4 but showing the two pieces of the antifriction bearing cage assembled.

In its simplest form, the second cage piece 14 consists of a ring portion of molded plastic construction, preferably of the same material as the first piece 12, having a plurality of circumferentially spaced holes 38 of rectangular cross section extending therethrough. The holes 38 have radial enlargements 40 at one end forming internal shoulders 42. The enlargements 40 extend to the end surface of the ring portion to facilitate molding the second cage piece 14 in an axial draw mold. The holes 38 are aligned with and respectively matingly receive the shank portions 22 of the first cage piece 12. The radial projections 24 and 26 are disposed in radial enlargements 40 with the radial shoulders 42 engaging the retention surfaces 28 and 30 to retain the two cage pieces in the assembled position shown in FIG. 3. The two cage pieces are assembled by inserting the shank portions 22 of the first cage piece 12 into the smaller end of the holes 38 in the second cage piece 14 and pressing against the second cage piece 14 until the projections 24 and 26 are snapped into position against the shoulders 42 and the second cage piece engages the end faces 20 of the finger portions 18.

We wish it to be understood that we do not desire to be limited to the exact details of construction shown and described, for obvious modifications will occur to a person skilled in the art.

What is claimed is:

1. A two piece, snap assembled bearing cage of molded plastic construction comprising:
 a first piece having a ring portion, a plurality of circumferentially spaced finger portions extending axially from said ring portion and a shank portion extending axially from an axial end face of a number of said plurality of finger portions, each of said shank portions having a radial projection spaced from the axial end face of its associated finger portion, said first piece having an axial groove extending through each of said number of finger portions and said ring portion in axial alignment with said radial projection to facilitate molding of said first piece, and a second piece comprising a second ring portion having said number of circumferentially spaced holes respectively receiving said shank portions of said first piece, each of said holes having a radial enlargement at one end which forms an internal radial shoulder engaging the radial projection of the shank portion received therein and extends to an end surface of said second ring portion to facilitate molding of said second piece.

2. A two piece, snap assembled bearing cage of molded plastic construction comprising:

a first piece having a ring portion, a plurality of circumferentially spaced finger portions extending axially from said ring portion and having axial end faces at the free end thereof defining a plane parallel to said ring portion, a shank portion extending axially from the axial end face of a number of said plurality of finger portions, each of said shank portions having a radially flexible end portion having a radial projection which is spaced from the axial end face of its associated finger portion and has a retention face parallel to said plane, said first piece having an axial groove extending through each of said number of finger portions and said ring portion in axial alignment with said radial projection, and exposing the entire retention face thereof to the remote end of the first piece to facilitate molding, a second piece comprising a second ring portion having said number of circumferentially spaced holes respectively receiving said shank portions of said first piece, each of said holes having a radial enlargment extending from one end forming an internal perpendicular radial shoulder engaging the retention face of the radial projection of the shank portion received therein.

3. A two piece, snap assembled bearing cage of molded plastic construction comprising:

a first piece having an annular ring portion, a plurality of circumferentially spaced finger portions extending axially from said ring portion and a generally rectangular shank portion extending axially from an axial end face of each of said plurality of finger portions, each of said shank portions having inner and outer radial projections at an end portion thereof spaced from the axial end face of its associated finger portion, said end portion having a circumferential slot for radial flexibility, said first piece having inner and outer axial grooves extending through each of said finger portions and said ring portion in axial alignment with inner and outer radial projections respectively and a second piece comprising a second annular ring portion having said plurality of circumferentially spaced generally rectangular holes respectively receiving said shank portions of said first piece, each of said holes having a radial enlargement at one end forming inner and outer radial shoulders respectively engaging the inner and outer radial projections of the shank portion received therein.

* * * * *